D. F. FETTER.
CAN-OPENER.
No. 191,416. Patented May 29, 1877.
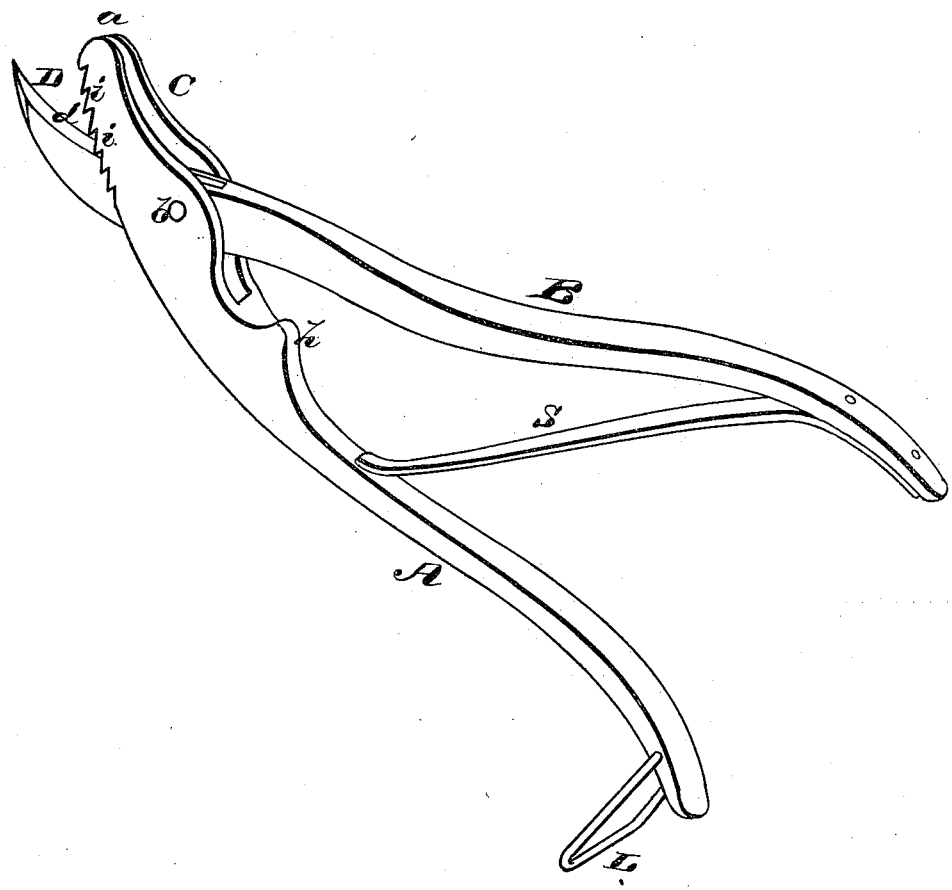

UNITED STATES PATENT OFFICE.

DAVID F. FETTER, OF NEW YORK, N. Y.

IMPROVEMENT IN CAN-OPENERS.

Specification forming part of Letters Patent No. 191,416, dated May 29, 1877; application filed April 21, 1877.

*To all whom it may concern:*

Be it known that I, DAVID F. FETTER, of New York, in the county of New York, and State of New York, have invented a new and valuable Improvement in Can-Openers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my can-opener.

My invention relates to improvements in can-openers; and consists in the employment of a curved blade, having a concave cutting-edge terminating in an upwardly-turned point, the cutting-blade being pivoted to a slotted convex jaw, having serrations on each side of its slot, as hereinafter more fully set forth and definitely claimed.

In the annexed drawing, which fully illustrates my invention, A and B represent the two handles, made substantially in the form shown. The front end of the lower handle A is curved upward and slotted longitudinally, forming a female jaw, C, the extreme outer end of which is contracted, as shown at $a$. The extreme front end of the upper handle B has a curved knife-blade, D, fastened in it, said blade being curved upward, running to a point, and its upper concave edge $d$ sharpened to form the knife edge. The blade D is passed downward through the female jaw C, and the end of the handle B pivoted therein, as shown at $b$.

The lower edges of the female jaw C are convex and serrated or toothed, as seen at $i$, said teeth or serrations pointing rearward.

The point of the blade D is forced through the can, while the handles are closed, sufficient to make the opening; then the handles are opened and, by a rolling motion of the hand, the instrument will cut its way through the can. As the jaws are closed the can is drawn into the same by the serrations $i$, which prevent the can from slipping. All that is required is to steady the object with one hand and press the handles together.

The handles are separated by a spring, S, fastened to one of them and bearing against the other.

One of the handles is also provided with a protuberance, $h$, which acts as a stop in closing the instrument. To one of the handles is pivoted a loop, L, which is thrown over the end of the other handle to keep the instrument closed when not in use.

I am aware that pruning-shears having a knife with a convex edge, working in a slot in a concave serrated and slotted holding-jaw, have heretofore been employed, and I therefore lay no claim to such invention.

What I claim as new, and desire to secure by Letters Patent, is—

The can-opener herein described, consisting of the curved blade D, having an upper concave cutting-edge, $d$, terminating in an upwardly-turned point and pivoted to the convex jaw C, serrated on each side of its slot, handles A B, and spring S, substantially as described, and for the purpose set forth.

In testimony that I claim the above I have hereunto subscribed my name in the presence of two witnesses.

D. F. FETTER, M. D.

Witnesses:
J. N. WILLIAMS,
THOMAS G. BURKE.